United States Patent Office 3,309,764
Patented Mar. 21, 1967

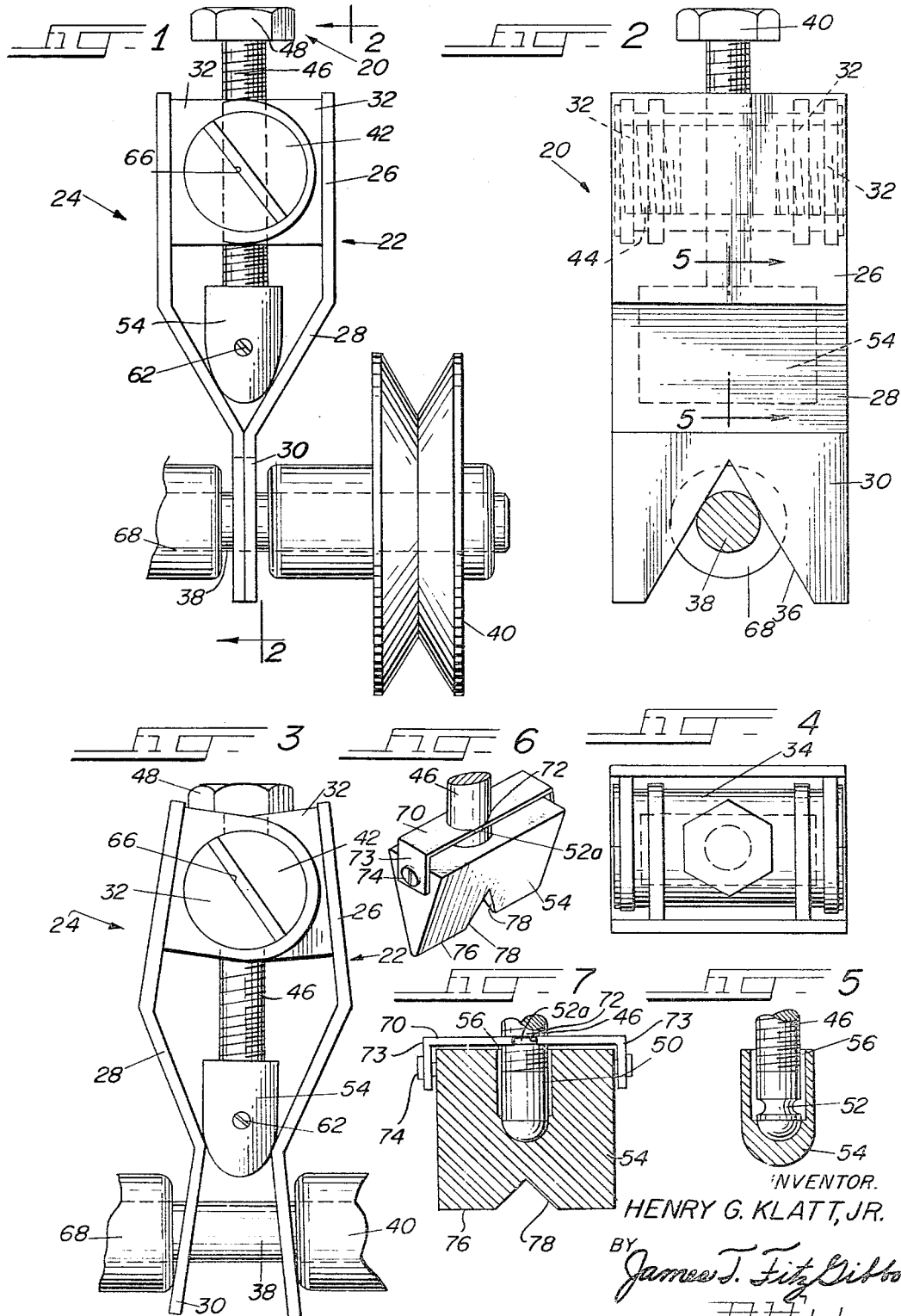

3,309,764
PULLEY REMOVAL TOOL HAVING THIN, WIDE FACES ADAPTED TO BE FORCED APART BY SCREW OPERATED WEDGE ELEMENT
Henry G. Klatt, Jr., 5722 S. Elizabeth,
Chicago, Ill. 60636
Filed Jan. 29, 1965, Ser. No. 428,906
1 Claim. (Cl. 29—239)

The present invention relates to a pulley removal tool, and more particularly to a tool for removing pulleys and the like from long shafts wherein there is limited or no access to the ends thereof. More particularly, the invention relates to a pulley removal tool in which two relatively wide and relatively thin faces or legs are closely disposed opposite each other at one end thereof, and hingedly attached to each other at the opposite end thereof, and in which a relatively wide force applying member, generally in the shape of a wedge, and actuated by means of a screw, is adapted to move the faces or legs apart for purposes of removing a pulley from a shaft, or the like.

Pulley removal tools are known in which a holding member is placed over the outer radial edges of the pulley, and force is placed thereon by screwing a bolt or the like against the pulley shaft in an axial direction. However, such tools are useful only where there is access to the end of the shaft, and wherein the pulley is situated closely adjacent the end of the shaft, inasmuch as there is a practical limit to the length of the pulley-engaging claw members of such devices.

In many instances, such as under conditions frequently encountered in the servicing and repair of air conditioners and like appliances, driving pulleys are located well inwardly or toward the centers of relatively long shafts, where conventional pulley removal tools will not operate to remove the pulleys situated thereon.

As a consequence, there is a need in these service industries, as well as elsewhere, for a tool which will be operative under various conditions and which is simple and effective, and which can be used with numerous different sizes and dimensions of pulleys and shafts with equally advantageous effect.

There is also a need for a tool which is operable with simple other tools, and one which provides a high degree of force multiplication.

There is also a need for such a tool of a simple and inexpensive construction.

Accordingly, it is an object of the present invention to provide a pulley removal tool which is simple and effective in use, and economical to manufacture.

It is an additional object of the present invention to provide a tool which is capable of longitudinally sliding a member fixed to a shaft while access to the tool is available only in a lateral or radially outwardly extending direction.

An additional object of the present invention is to provide a tool in which the pressure-imparting legs or faces may be removed and readily replaced with legs of different dimensions or proportions to facilitate removal of many different sizes of pulleys.

It is another object of the present invention to provide a tool in which the faces, legs, or force-imparting members are relatively thin and wide, and thus able to fit into narrow axial clearances between pulleys and the like, and yet provide sufficient strength to resist bending from the force imparted thereto.

It is an additional object of the present invention to provide a structure for a pulley removal tool in which the force is applied to a point relatively near to the situs of the work sought to be done, rather than relatively remote therefrom.

It is another object of the present invention to provide a construction in which there are a plurality of means provided for multiplying the forces applied to the task of sliding the pulley along the shaft.

Another object of the invention is to provide a construction which includes means for centering the tool on the shaft to prevent difficulties with the alignment thereof.

It is another object of the invention to provide a tool to which access may be readily gained from a number of work positions.

Another object of the invention is to provide a tool in which simple elements or parts are replaceable independently of the more complex or expensive elements, to provide, in effect, an adjustment feature with maximum simplicity.

In addition, it is an object to provide, in the present invention, a tool which employs components which are simple and inexpensive.

The above, and other objects and advantages of the present invention, including those which are inherent therein, will become more apparent when considered in conjunction with a description of the preferred embodiments of the invention, and as shown in the drawings, in which like numerals indicate corresponding parts throughout the various figures, and in which:

FIG. 1 is an end elevational view of the pulley removal tool of the present invention, with parts of the pulley-supporting shaft shown broken away;

FIG. 2 is a side elevational view of the pulley removal tool of the invention, showing it in the position of use, disposed over a shaft, which is shown in vertical section;

FIG. 3 is an end elevational view of the tool of the present invention similar to FIG. 1, but showing the tool in its expanded position in use;

FIG. 4 is a top plan view of the tool of the present invention;

FIG. 5 is a vertical sectional view of the wedging element and screw member of the invention, taken along lines 5—5 of FIG. 2.

FIG. 6 is an isometric view of a modified form of the wedging element of the present invention.

FIG. 7 is a vertical sectional view of the modified form of the wedging element shown in FIG. 6.

Referring now to the drawings in greater detail, there is shown generally at 20 a pulley removal tool, and this tool 20 is shown to include a front face member 22 and a rear face member 24, each member 22, 24 being substantially identical to each other. Each front or rear face member 22, 24, comprises four principal portions, namely an upper face portion 26, an intermediate, angled face or ramp portion 28, and a lower, work-engaging portion 30, and fixedly attached to the upper face portions 26, upper pivot flanges 32. The pivot flanges 32 include openings therein to accommodate a pivot shaft 34, and the combination of the shaft 34 and the flanges 32 makes up a hinge assembly, to be described in greater detail herein. The work-engaging portion of the faces 22, 24 also includes a cutout or re-entrant portion 36 to accommodate the shaft 38 on which a pulley 40 is customarily supported.

The pivot shaft 34 may include at the end thereof, a cap element 42, removably mounted in the shaft 34 by conventional means, such as threads 44. Such a cap element 42 provides for easy disassembly of the hinge unit formed by the shaft 34 and the flanges 32.

The pivot shaft 34 also includes a threaded bore disposed therein, for accommodating and locating an operating screw 46. This operating screw 46 includes drive means, in this case, in the form of a hexagonal head 48, at the top thereof, and, at the lower end thereof, a thread-free portion 50, and a retainer groove 52. The thread-free portion 50 and the retainer groove 52 combine to locate a wedging element 54, and this element 54 contains an upwardly facing opening 56, to accommodate entry of the thread-free portion 50 of the operating screw 46. In addition, one or more threaded bores 58 are provided which communicate with the opening 56 and into which are inserted threaded locating pins 60. The locating pins 60 are equipped with end slots 62 to facilitate removal of the screw 46 from the wedging element 54. The inner ends of the locating pins 60 may terminate in projections 64 of a shape corresponding to the retainer grooves 52, to prevent undesired vertical displacement of the screw 46 relative to the wedging element 54, but to allow rotation of the screw 46 relatives to the element 54, so that the removal tool will operate in its intended manner.

In use, the removal tool is operated by placing the tool 20 over a shaft 38, and lowering the tool until the centering cutout 36 contacts the shaft 38. Thereupon, the screw 46 is turned by its head 48, and the wedge 54 is moved downwardly to displace the faces 22, 24 apart, in a direction parallel to the axis of the shaft 38. The faces 22, 24 pivot about the pivot shaft 34, allowing the lower, work-engaging faces or portions 30 to move the pulley 40 axially of the shaft 38.

The wedge 54, being of rather wide dimensions, transmits the moving force and distributes it over a large proportion of the faces 22, 24, while the ramps or inclined sections 28 of the faces 22, 24 provide a mechanical advantage in addition to that afforded by the wedge 54.

The front and read faces of the removal tool are removable and replaceable, and interchangeable with other faces of the same general configuration, but which may have longer or shorter faces and portions thereof, and different length or differently tapered ramps, as may be desired, depending on the size and location of the pulley. Removal and replacement of the different replacement faces may be accomplished by removing the threaded cap 42 from the pivot shaft 34. A slot 66 may be provided for this purpose, to receive a coin, for example. After slightly loosening the pins 60, the operating screw 46 is removed from the pivot shaft 34, and the faces 22, 24 are removed and replaced, with assembly of the device being accomplished in reverse order of disassembly. In the embodiment of the invention shown in FIGS. 6 and 7, the lower edge of the wedge element 54 can be relatively pointed or acutely angled, as shown in FIG. 6 rather than somewhat rounded, as shown in FIG. 5, when the lower portion of the wedge element 54 is formed with a sharply acute angle, a sharp bottom lower edge 76 is formed. In this case, two wall portions 78 are cut upwardly and inwardly in the sharp bottom lower edge 76 to form a re-entrant (FIGS. 6, 7) which corresponds in shape to the re-entrant portions 36 provided in the lower portions 30 of the face members (FIG. 2).

In another embodiment of the present invention, spring clips are provided as the means for locating the operating screw 46 in relation to the wedge element 54. This construction is shown in FIGS. 6 and 7, wherein there are shown spring clips 70, with inner, arcuate edge portions 72 adapted to engage a retainer groove 52a in the operating screw 46.

The lower end portion of the operating screw 46 turns freely in the wedge element 54. Downwardly depending flanges 73 are provided on the clips 70, and screws 74 or the like are used to attach the flanges 73, and thus the clips 70, to the wedge 54. In this construction, disassembly of the unit is simplified, and, since most of the force, in use of the device, is directed downwardly, a relatively thin material, such as thin spring steel, is suitable for constructing the clips 70.

With a removal tool such as that shown herein, pulleys may be removed conveniently from any length shaft, even where no bearing housing or "pillow block" 68, for example, is provided, or where there is resistance to movement of the pulley along the shaft after the housing 68 is some distance away. An operation of this sort is simply performed by placing a snap-over-center pliers ("Vise-Grip") over the shaft 38 to act as a rear stop for the lower portion 30 of the rear face 24.

The provision of the hex nut 48 on the end of the screw 46 is a convenient method of rendering ordinary socket wrenches suitable for use in the invention, inasmuch as such wrenches normally have extensions, ratchets, and the like readily available in the sets in which they are purchased.

The location of the wedge element 54 near the bottom of the tool increases the effectiveness of the tool inasmuch as the operating components are kept inside the pressure-applying faces and the components are located relatively near the bottom of the tool, so that thin faces can be used and still retain sufficient strength for removing firmly attached members from shafts.

It will thus be seen, from the foregoing description, taken in conjunction with the drawings illustrating the invention, that the present invention provides a novel pulley removal tool having desirable advantages and characteristics, including those hereinbefore referred to and others which are inherent in the invention.

Various modifications of the illustrated form of the present invention will be apparent to those skilled in the art, and I contemplate that such modifications may be made without departing from the spirit of the invention, or the scope of the appended claim.

I claim:

A pulley removal tool, comprising, in combination,
(a) a pivot shaft, including a vertically disposed central bore therein,
(b) two oppositely disposed relatively thin, wide face members, each of said face members including
  (1) an upper face portion including pivot flanges movably attached to said pivot shaft,
  (2) a lower face portion with a bottom edge, including a re-entrant portion being adapted to receive a shaft member therein,
(c) a threaded operating screw member extending through said vertically disposed central bore, said screw member having a clip-receiving groove disposed near the bottom thereof,
(d) a generally wedge shaped force applying member attached to the lower end of said screw member so as to allow relative rotation between said force applying member and said screw member, said force applying member being of substantially the same horizontal extent as said face members and being adapted to contact said face members substantially along its entire horizontal extent, said force applying member having the top thereof attached to the bottom of said screw member with the point of said force applying member disposed downwardly and away from the bottom of said screw member, and
(e) clips for attaching said screw member to said force applying member, said clips being attached at one of the respective ends thereof to the sides of said force applying member, and extending therefrom over the top of said force applying member, and having the other respective ends thereof terminating at and engaging said clip-receiving groove in said screw member, whereby rotation of said screw member in one direction causes said force applying member to move downwardly between said face members and force said lower portions of said face members apart.

References Cited by the Examiner

UNITED STATES PATENTS

| | | | |
|---|---|---|---|
| 559,803 | 5/1896 | Johnson | 29—262 X |
| 1,159,626 | 11/1915 | Vlchek | 29—218 |
| 1,201,445 | 9/1916 | Decker | 29—217 |
| 1,331,602 | 2/1920 | Webb | 29—218 |
| 1,478,964 | 12/1923 | Klay | 29—261 |
| 1,650,023 | 11/1927 | Maxwell | 29—262 |
| 1,743,825 | 1/1930 | Martens | 29—258 X |
| 2,632,238 | 3/1953 | Dyck | 29—239 X |
| 2,971,254 | 2/1961 | Fairfield | 29—261 |

FOREIGN PATENTS

| | | |
|---|---|---|
| 826,905 | 1/1960 | Great Britain. |
| 4,000 | 3/1884 | Sweden. |

WILLIAM FELDMAN, *Primary Examiner.*

M. C. KRUSE, *Examiner.*